3,056,752
METHOD OF COATING HEAT-EXPANSIBLE RESIN PARTICLES WITH A SOLUTION OF PERFLUOROOCTANOIC ACID AND COATED COMPOSITION OBTAINED THEREBY
Maurice L. Zweigle, Midland, Mich., assignor to The Dow Chemical Company, Midland, Mich., a corporation of Delaware
No Drawing. Filed Dec. 29, 1960, Ser. No. 79,141
6 Claims. (Cl. 260—2.5)

This invention relates to an improvement in the production of expansible thermoplastic resins. More particularly, it relates to a method of improving the handling and processing characteristics of foamable thermoplastic resinous beads or granules.

The technique of forming foamed or cellular bodies of thermoplastic resinous materials through the employment of so-called "foam-in-place" beads is well known. The technique involves incorporating, through any of a variety of well known means, into small particles or beads of the thermoplastic resin a volatile organic liquid that is soluble in the resin without dissolving it. When the bead containing such a liquid is later heated to or above the softening point of the resin and above the boiling point of the liquid, the vapors act as a blowing agent, producing a multiplicity of discrete, gas-filled cells within the bead with concomitant multifold expansion of the size of the bead. The bead, of course, on cooling below its softening point maintains the approximate size it achieves as a result of this blowing action.

In the production of articles from such foamable beads, a requisite quantity of the beads may be placed in a porous mold and the beads are heated to a temperature sufficient to cause their expansion to fill the mold cavity and to cause the thus foamed beads to fuse together. This method is subject to some criticism, however. The large volumetric change makes the attainment of uniform density throughout the molded article extremely difficult. Accordingly, it is the more usual practice to prefoam the beads, prior to their being loaded into the mold. This is achieved by heating the beads to a temperature lower than that employed in the first described method, but sufficiently great to cause substantial swelling of the beads. When such prefoamed beads which still contain foaming agent are employed in the production of molded articles they are used in an amount sufficient to fill or to substantially fill the mold cavity. Subsequent heating, therefore, causes relatively small volumetric change and makes for uniform density throughout the article. The temperature in this operation is sufficiently high to cause the necessary additional foaming and to cause the fusing together of the foamed beads.

A major difficulty encountered in this technique of pre-foaming lies in the fact that the temperature of pre-foaming and that of final molding are not widely separated. Accordingly, despite careful control of the pre-foaming process, some fusion of the foamed beads will frequently occur. This leads to wasteful scrap losses and the need for additional processing to separate the desired individual pre-foamed beads from the clumped or fused waste material.

As an example of the above, the commonly used foamable polystyrene beads containing normal pentane as the blowing agent may be considered. This material originally has a bulk density of from about 45 to 50 pounds per cubic foot. On being heated to a temperature of approximately 85° to 100° C. for a time of about 3 to 10 minutes it expands to give a product of a density of from about 1 to about 10 pounds per cubic foot of the beads. The temperature to which these foamed beads are raised in ultimate use is usually about 85 to 110° C. and the final density is of the order of from 1 to 10 pounds per cubic foot.

In view of the difficulties described above, it is the principal object of the present invention to provide a means whereby foamable thermoplastic resin beads may be pre-expanded without resultant clumping together of the pre-foamed beads. It is a further and important object of the invention to achieve this first stated object without imparing the ability of the foamed beads to cohere in a unitary structure when heated to final processing temperature. Other and related objects will be apparent from a consideration of the specification and examples to follow.

It has now been discovered that treatment of unexpanded foamable thermoplastic resinous beads with a minor amount of perfluorooctanoic acid is an effective means of preventing the clumping together of the foamed beads resulting from the heating of the foamable beads to a temperature sufficiently high to cause substantial pre-foaming. It has further been found that the perfluorooctanoic acid does not interfere with the necessary fusion of the foamed beads in final fabrication.

Incorporation of the perfluorooctanoic acid with the foamable thermoplastic resinous beads is effected simply by thoroughly mixing the beads with a dilute solution of the acid in an inert solvent and thereafter drying the beads to remove the carrier solvent. As the solvent for the perfluorooctanoic acid, water is the preferred material because of its inertness relative to the resin and because its evaporation gives rise to no fire or toxicological hazard. Other solvents, such as ethanol, methanol or petroleum ether may, however, be employed if desired, the choice being limited to those materials that have no solvent action on the resin employed and which are not reactive with the perfluorooctanoic acid.

The total volume of the solution of perfluorooctanoic acid should be such that in the mixing operation all the beads are readily brought into contact with the liquid.

The amount of perfluorooctanoic acid necessary to be employed is surprisingly small. It has been found that the presence of as little as 10 parts per million, based on the weight of foamable beads treated, is sufficient to permit prefoaming of the beads with only negligible clumping eventuating. In general however, it is desirable that a somewhat larger quantity, of the order of about 30 parts per million for example, be employed. If amounts greatly in excess of 500 parts per million be employed, interference with the necessary fusing action may be encountered when the prefoamed beads are employed in fabricating foam resin articles therefrom.

The invention is illustrated in and by the following examples, which are intended to be merely demonstrative and not limiting, and wherein all parts and percentages are on a weight basis.

*Example 1*

To 20 pounds of expandable polystyrene beads containing about 6.5 percent by weight of normal pentane as blowing agent and having a bulk density of 40 pounds per cubic foot there was added in a ribbon blender a solution of 0.3 gram of perfluorooctanoic acid in 8 ounces of water. The mixture was thoroughly blended and was then dried. Blending was continued during the drying operation to insure that no loss of perfluorooctanoic acid occurred through drainage of the solution from the beads. The dried material was then expanded by contact with steam at a temperature of approximately 99° C. to a bulk density of one pound per cubic foot of the expanded beads. Screen analysis indicated that, on a volumetric basis, less than 1 percent of the material was in the form of clumped together beads.

Example 2

Twenty pounds of the expandable beads of Example 1 were expanded by contact with steam as therein described without pre-treatment with perfluorooctanoic acid. Screen analysis of the resultant material showed that 20 percent of the material was in the form of fused together masses of several beads.

Example 3

The experiment described in Example 1 was repeated with the amount of perfluorooctanoic acid reduced to 0.15 gram. Screen analysis of the product showed that less than 1 percent, on a volumetric basis, of the beads had fused together.

Example 4

The partially expanded polystyrene beads of Example 1 were employed to substantially fill a covered porous mold. Steam at a pressure of 50 p.s.i. was injected into the mass, through probes passing through the walls of the mold, to give a mold cavity temperature of about 110° C. The resultant molded body on inspection gave no evidence of failure of the pre-foamed beads to bond together. It was in all respects the equivalent of a body molded from untreated beads.

What is claimed is:

1. A method of inhibiting the cohesion of heat-expansible, thermoplastic, resinous particles when said particles are heated to a temperature which is sufficiently high to cause substantial expansion thereof with resultant formation of prefoamed particles capable of further foaming up, which method comprises depositing on said particles from about 30 to about 500 parts per million, based on the total weight of said particles, of perfluorooctanoic acid prior to heating to said prefoaming temperature.

2. A method according to claim 2 wherein deposition of the perfluorooctanoic acid is effected by wetting the particles with a solution of perfluorooctanoic acid in a solvent therefor which is a non-solvent for the resin, and thereafter effecting the evaporation of said solvent.

3. A method according to claim 2 wherein the said solvent is water.

4. A method according to claim 3 wherein the heat-expansible, thermoplastic, resinous particles are polystyrene particles.

5. A composition of matter comprising a substantially uniform admixture of heat-expansible, thermoplastic resinous particles and an amount of perfluorooctanoic acid equal to from about 30 parts to about 500 parts by weight, based on one million parts of said particles, of perfluorooctanoic acid.

6. A composition according to claim 5 wherein the heat-expansible, thermoplastic, resinous particles are polystyrene particles.

No references cited.